(12) United States Patent
Simpson

(10) Patent No.: US 12,475,587 B2
(45) Date of Patent: Nov. 18, 2025

(54) SYSTEM AND METHODS FOR AUTOMATIC DETECTION OF ADJUSTABLE ITEM DIMENSION BASED ON SENSOR DISTANCE AND STORED FIXED DIMENSIONS

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/743,022

(22) Filed: Jun. 13, 2024

(65) Prior Publication Data

US 2024/0338840 A1    Oct. 10, 2024

Related U.S. Application Data

(63) Continuation of application No. 17/186,512, filed on Feb. 26, 2021, now Pat. No. 12,014,513.

(60) Provisional application No. 62/983,377, filed on Feb. 28, 2020.

(51) Int. Cl.
| | |
|---|---|
| *G06T 7/62* | (2017.01) |
| *G01B 11/02* | (2006.01) |
| *G01B 11/04* | (2006.01) |
| *G06T 7/70* | (2017.01) |

(52) U.S. Cl.
CPC .............. *G06T 7/62* (2017.01); *G01B 11/026* (2013.01); *G01B 11/043* (2013.01); *G01B 11/046* (2013.01); *G06T 7/70* (2017.01)

(58) Field of Classification Search
None
See application file for complete search history.

(56) References Cited

U.S. PATENT DOCUMENTS

| | | | |
|---|---|---|---|
| 2019/0026587 A1* | 1/2019 | Simpson | H04N 1/00331 |
| 2019/0128819 A1* | 5/2019 | Zeppenfeld | G06T 7/0004 |
| 2021/0272309 A1* | 9/2021 | Simpson | G06T 7/62 |

FOREIGN PATENT DOCUMENTS

CA        3215825 A1 * 10/2022    ........... B65G 1/1371

* cited by examiner

*Primary Examiner* — Tahmina N Ansari
(74) *Attorney, Agent, or Firm* — Knobbe, Martens, Olson & Bear, LLP

(57) ABSTRACT

The present disclosure relates to a system and method for automatically determining a three dimensional size of an item. The system may include an optical sensor scanning a surface of the item being transported on a conveyor spaced apart from the optical sensor by a conveyor distance, the surface including a standard size element having a first dimension. The system may also include a memory storing the first dimension and the conveyor distance. The system may also include a processor configured to calculate a second dimension of the surface based on a scanned image of the surface and a scanned image of the standard size element and the stored first dimension. The processor may obtain an item distance between the optical sensor and the surface and determine a height of the item based on the obtained item distance and the stored conveyor distance.

20 Claims, 12 Drawing Sheets

SYSTEM AND METHODS FOR AUTOMATIC DETECTION OF ADJUSTABLE ITEM DIMENSION BASED ON SENSOR DISTANCE AND STORED FIXED DIMENSIONS

CROSS-REFERENCE TO RELATED APPLICATIONS

The present application is a continuation of U.S. patent application Ser. No. 17/186,512, filed Feb. 26, 2021, which claims priority to and the benefit of Provisional Application No. 62/983,377 filed on Feb. 28, 2020 in the U.S. Patent and Trademark Office, the entire contents of which are incorporated herein by reference.

BACKGROUND

Technical Field

The described technology generally relates to image processing, and in particular to a system and method for automatically determining a three dimensional size of an item such as a mail package based on a known dimension of a standard size element such as a label provided on the item.

Description of the Related Technology

Items, such as articles of mail (e.g., letters, flats, parcels, boxes, and the like), warehouse inventories, or packages are frequently received into a processing facility in volume, and must be sorted into particular groups to facilitate further processes such as, for example, delivery of the item to a specified destination. The particular groups can correspond to destinations or other information identified on the item. Processing items or articles can include scanning the items or articles that are being transported on a conveyor and processing a scanned image of the items or articles.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for automatically determining a three dimensional size of an item.

One aspect is a system for automatically determining a three dimensional size of an item, the system comprising: an optical sensor configured to scan a surface of the item facing the optical sensor while the item is being transported on a conveyor, the conveyor spaced apart from the optical sensor by a conveyor distance, the surface of the item including a standard size element having a first dimension; a memory configured to store the first dimension and the conveyor distance; and a processor in data communication with the optical sensor and the memory and configured to: calculate a second dimension of the surface of the item based on pixel data of a scanned image of the surface of the item and pixel data of a scanned image of the standard size element and the stored first dimension, the second dimension greater than the first dimension; obtain an item distance between the optical sensor and the surface of the item; and determine a height of the item based on the obtained item distance and the stored conveyor distance.

In the above system, the first dimension comprises a width of the standard size element, and wherein the second dimension comprises first and second widths of the surface of the item. In the above system, in calculating the second dimension of the surface of the item, the processor is configured to: calculate a number of pixels for the width of the standard size element; determine a ratio of the calculated pixel number to the stored width of the standard size element; calculate a first number of pixels for the first width of the surface of the item and a second number of pixels for the second width of the surface of the item; and determine the first and second widths of the surface of the item based on the first and second pixel numbers of the surface of the item and the determined ratio.

In the above system, the optical sensor is configured to be positioned above the item, and wherein the surface of the item is a top surface of the item. In the above system, the first dimension comprises length and width of the standard size element, and wherein the second dimension comprises length and width of the top surface of the item. In the above system, in calculating the second dimension of the top surface of the item, the processor is configured to: calculate a horizontal number of pixels for the length of the standard size element and/or a vertical number of pixels for the width of the standard size element; determine a first ratio of the calculated horizontal pixel number to the stored length of the standard size element and/or a second ratio of the calculated vertical pixel number to the stored width of the standard size element; calculate a horizontal number of pixels for the length of the top surface of the item and a vertical number of pixels for the width of the top surface of the item; and determine the length and width of the top surface of the item based on the length and width pixel numbers of the top surface of the item and at least one of the first and second ratios.

In the above system, in determining the length and width of the top surface of the item, the processor is configured to multiply the at least one ratio and the length and width pixel numbers of the top surface of the item. In the above system, the stored conveyor distance represents a distance between the optical scanner and a top surface of the conveyor facing the optical scanner, and wherein the processor is configured to determine the height of the item by subtracting the obtained item distance from the stored conveyor distance. In the above system, the optical sensor is configured to determine or sense the item distance, and wherein the processor is configured to receive the determined or sensed item distance from the optical sensor.

In the above system, the optical sensor is configured to determine or sense the item distance and store the determined or sensed item distance in the memory, and wherein the processor is configured to retrieve the determined or sensed item distance from the memory. In the above system, the optical sensor is configured to determine the item distance based on a scaling factor or a relationship between the conveyor distance and pixel sizes of the standard size element and a sample region on the conveyor belt having the same dimension as the standard size element. In the above system, the scaling factor or relationship is stored in the memory.

The above system further comprises a distance measurement sensor configured to measure the item distance, wherein the processor is configured to receive the sensed item distance from the distance measurement sensor. In the above system, the optical sensor is configured to be positioned in front of the item, and wherein the surface of the item is a front surface of the item.

In the above system, the first dimension comprises length and width of the standard size element, and wherein the second dimension comprises length and width of the front surface of the item. In the above system, in calculating the second dimension of the front surface of the item, the processor is configured to: calculate a horizontal number of pixels for the length of the standard size element and/or a vertical number of pixels for the width of the standard size element; determine a first ratio of the calculated horizontal pixel number to the stored length of the standard size element and/or a second ratio of the calculated vertical pixel number to the stored width of the standard size element; calculate a horizontal number of pixels for the length of the front surface of the item and a vertical number of pixels for the width of the front surface of the item; and determine the length and width of the front surface of the item based on the length and width pixel numbers of the front surface of the item and at least one of the first and second ratios.

In the above system, in determining the length and width of the front surface of the item, the processor is configured to multiply the at least one ratio and the calculated length and width pixel numbers of the front surface of the item. In the above system, the stored conveyor distance represents a distance between the optical scanner and a rear surface of the conveyor opposing a front surface of the conveyor facing the optical scanner, and wherein the processor is configured to determine the height of the item by subtracting the obtained item distance from the stored conveyor distance.

In the above system, a rear surface of the item opposing the front surface of the item is configured to be adjacent to or substantially aligned with the rear surface of the conveyor while the item is transported on the conveyor. In the above system, the standard size element comprises at least one of a recipient section, a sender section, a barcode section, a postage section or a combination thereof. In the above system, the item is height-adjustable and has an initial height, and wherein the item has an adjusted height different from the initial height. In the above system, the item is inflatable or deflatable.

Another aspect is a system for automatically determining a three dimensional size of an item, the system comprising: an optical sensor configured to scan a top surface of the item facing the optical sensor while the item is being transported on a conveyor, the conveyor spaced apart from the optical sensor by a conveyor distance, the top surface of the item including a standard size element having a first dimension; a memory configured to store the first dimension and the conveyor distance; and a processor in data communication with the optical sensor and the memory and configured to: calculate a second dimension of the top surface of the item based on pixel data of a scanned image of the top surface of the item and pixel data of a scanned image of the standard size element and the stored first dimension, the second dimension greater than the first dimension; obtain an item distance between the optical sensor and the top surface of the item; and determine a height of the item by subtracting the obtained item distance from the stored conveyor distance.

Another aspect is a system for automatically determining a three dimensional size of an item, the system comprising: an optical sensor configured to scan a front surface of the item facing the optical sensor while the item is being transported on a conveyor, the conveyor spaced apart from the optical sensor by a conveyor distance, the front surface of the item including a standard size element having a first dimension; and a memory configured to store the first dimension and the conveyor distance; a processor in data communication with the optical sensor and the memory and configured to: calculate a second dimension of the front surface of the item based on pixel data of a scanned image of the front surface of the item and pixel data of a scanned image of the standard size element and the stored first dimension, the second dimension greater than the first dimension; obtain an item distance between the optical sensor and the front surface of the item; and determine a height of the item by subtracting the obtained item distance from the stored conveyor distance.

Another aspect is a method of automatically determining a three dimensional size of an item, the method comprising: storing, in a memory, a first dimension of a standard size element provided on a surface of the item facing an optical scanner; storing, in the memory, a conveyor distance between the optical scanner and a conveyor on which the item is being transported; scanning, by the optical scanner, the surface of the item while the item is being transported on the conveyor; calculating, by a processor, a second dimension of the surface of the item based on pixel data of a scanned image of the surface of the item and pixel data of a scanned image of the standard size element and the stored first dimension, the second dimension greater than the first dimension; obtaining, by the processor, an item distance between the optical sensor and the surface of the item; and determining a height of the item based on the obtained item distance and the stored conveyor distance.

In the above method, the optical sensor is positioned above the item, and wherein the surface of the item is a top surface of the item. In the above method, the first dimension comprises length and width of the standard size element, and wherein the second dimension comprises length and width of the top surface of the item. In the above method, calculating the second dimension of the top surface of the item comprises: calculating, by the processor, a horizontal number of pixels for the length of the standard size element and/or a vertical number of pixels for the width of the standard size element; determining, by the processor, a first ratio of the calculated horizontal pixel number to the stored length of the standard size element and/or a second ratio of the calculated vertical pixel number to the stored width of the standard size element; calculating, by the processor, a horizontal number of pixels for the length of the top surface of the item and a vertical number of pixels for the width of the top surface of the item; and determining, by the processor, the length and width of the top surface of the item based on the length and width pixel numbers of the top surface of the item and at least one of the first and second ratios.

In the above method, determining the length and width of the top surface of the item comprises multiplying the at least one ratio and the calculated length and width pixel numbers of the top surface of the item. In the above method, the stored conveyor distance represents a distance between the optical scanner and a top surface of the conveyor facing the optical scanner, and wherein determining the height of the item comprises subtracting the obtained item distance from the stored conveyor distance.

In the above method, the item distance is determined or sensed by the optical sensor and transmitted to the processor. In the above method, the item distance is retrieved by the processor from the memory. In the above method, the optical sensor is positioned in front of the item, and wherein the surface of the item is a front surface of the item. In the above method, the first dimension comprises length and width of the standard size element, and wherein the second dimension comprises length and width of the front surface of the item.

In the above method, calculating the second dimension of the front surface of the item comprises: calculating, by the processor, a horizontal number of pixels for the length of the standard size element and/or a vertical number of pixels for the width of the standard size element; determining, by the processor, a first ratio of the calculated horizontal pixel number to the stored length of the standard size element and/or a second ratio of the calculated vertical pixel number to the stored width of the standard size element; calculating, by the processor, a horizontal number of pixels for the length of the front surface of the item and a vertical number of pixels for the width of the front surface of the item; and determining, by the processor, the length and width of the front surface of the item based on the calculated length and width pixel numbers of the front surface of the item and at least one of the first and second ratios.

In the above method, determining the length and width of the front surface of the item comprises multiplying the at least one ratio and the calculated length and width pixel numbers of the front surface of the item. In the above method, the stored conveyor distance represents a distance between the optical scanner and a rear surface of the conveyor opposing a front surface of the conveyor facing the optical scanner, and wherein the height of the item is determined by subtracting the obtained item distance from the stored conveyor distance.

In the above method, a rear surface of the item opposing the front surface of the item is adjacent to or substantially aligned with the rear surface of the conveyor. In the above method, the standard size element comprises at least one of a recipient section, a sender section, a barcode section, a postage section, or a combination thereof. In the above method, the item is height-adjustable and has an initial height, and wherein the item has an adjusted height different from the initial height. In the above method, the obtaining comprises determining the item distance based on a scaling factor or a relationship between the conveyor distance and pixel sizes of the standard size element and a sample region on the conveyor belt having the same dimension as the standard size element, and wherein the scaling factor or relationship is stored in the memory.

Another aspect is a method of automatically determining a three dimensional size of an item, the method comprising: storing, in a memory, a first dimension of a standard size element provided on a top surface of the item facing an optical scanner; storing, in the memory, a conveyor distance between the optical scanner and a conveyor on which the item is being transported; scanning, by the optical scanner, the top surface of the item while the item is being transported on the conveyor; calculating, by a processor, a second dimension of the top surface of the item based on pixel data of the top surface of the item and pixel data of the standard size element and the stored first dimension, the second dimension greater than the first dimension; obtaining, by the processor, an item distance between the optical sensor and the top surface of the item; and determining a height of the item by subtracting the obtained item distance from the stored conveyor distance.

Another aspect is a method of automatically determining a three dimensional size of an item, the method comprising: storing, in a memory, a first dimension of a standard size element provided on a front surface of the item facing an optical scanner; storing, in the memory, a conveyor distance between the optical scanner and a conveyor on which the item is being transported; scanning, by the optical scanner, the front surface of the item while the item is being transported on the conveyor; calculating, by a processor, a second dimension of the front surface of the item based on pixel data of the front surface of the item and pixel data of the standard size element and the stored first dimension, the second dimension greater than the first dimension; obtaining, by the processor, an item distance between the optical sensor and the front surface of the item; and determining a height of the item by subtracting the obtained item distance from the stored conveyor distance.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
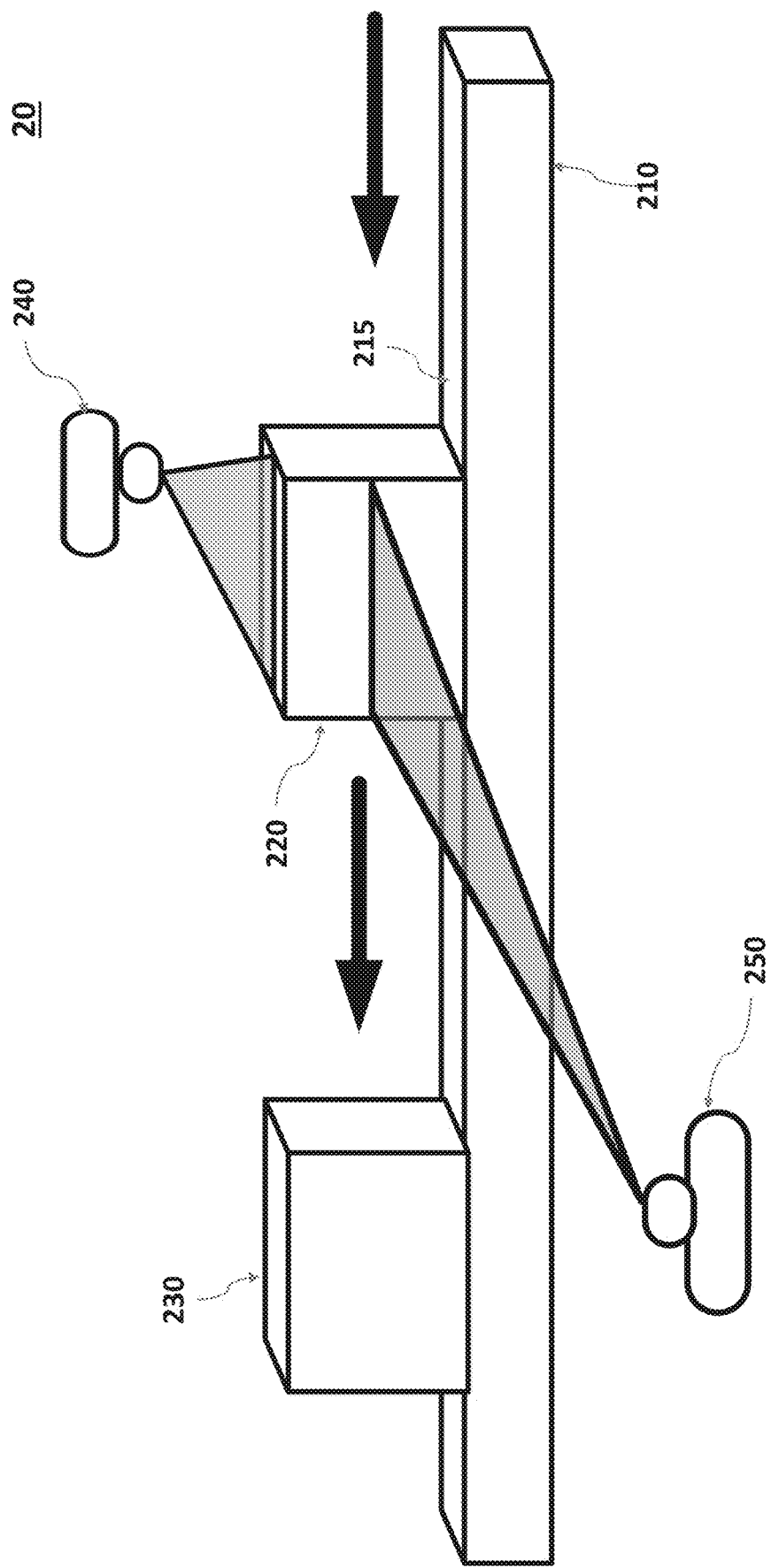
FIG. 1 illustrates an exemplary item processing system for processing items including two optical scanners.

Provided herein are various embodiments of systems and methods for automatically determining a three dimensional size of an item such as a mail package based on a known dimension of a standard size element such as a label provided on the item using a single optical sensor. Embodiments described herein can significantly improve an item processing speed and reduce an overall cost, as only a single camera or optical scanner can be used so that the functionality of computing devices such as an item processing system is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Some embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

Where a plurality of images are captured, large volumes of data are created. This can be the case in various applications, such as recording video, photographing items, such as archives, and other applications where multiple images are being captured. A large amount of data is generated when handling items through processing systems. Handling items can include capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting items or articles can be done using imaging technologies. The ability to accurately process a given item may be limited by the effectiveness of the imaging technology to extract accurate information about each item. The information may include personal information about the sender or receiver of the item such as name, address, account information, or other information that is provided in trust that public disclosure will be limited if not avoided altogether. Careful handling of the personal information includes careful handling of images taken of the item during processing. Mail delivery is one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

Distribution items, such as mailpieces or parcels are processed on item processing equipment which can scan the items to obtain information, e.g., addresses, types of items, barcode, etc. The item processing facility will be described first. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, or otherwise interpret information on the item, including, for example, a delivery point, a sender, or other identifier, etc., from each item processed. The destination end point may be encoded in a computer readable code, such as a barcode printed on or affixed to the item. In some embodiments, the destination end point may be read by taking an image of the item and performing an optical character recognition (OCR) process on the image, and determining the delivery end point from the OCR'd address. In some embodiments, the item processing equipment can apply a computer readable code that encodes the delivery end point and may print or spray the computer readable code onto the item.

The cost of sending a package relates to the size of the item or the item dimensions. The type of processing equipment needed to process an item can depend on the item dimensions. In some embodiments, the item dimensions can implicate constraints on how the item is transported, what types of containers can be used, what type of vehicles can be used, and the like. In existing processes, the dimensioning of items has been performed manually, or been roughly estimated, or dimensions provided by a shipper are relied on. These processes are time consuming, cumbersome, and potentially inaccurate. By automatically determining the dimensions of items in the distribution network, time and resources can be saved, and delivery efficiency can be increased.

FIG. 1 illustrates an item processing system 20 for processing items including two optical scanners. The item processing system 20 includes a conveyor 210, an upper optical scanner 240 and a front optical scanner 250. The conveyor 210 transports items 220 and 230 via a conveyor belt 215 of the conveyor 210. For the purpose of convenience, only two items 220 and 230 are shown in FIG. 1, however, the scanners 240 and 250 may continuously scan many more items (not shown) that are being transported on the conveyor belt 215. The upper scanner 240 is spaced apart and positioned above the conveyor 210 so as to scan top surfaces of the items 220 and 230. The upper scanner 240 can determine the dimension of the top surface of the item 220, for example, a length and a width of the top surface of the item 220. The front optical scanner 250 is positioned in front of the conveyor 210 so as to scan a front surface of the item 220 being transported on the conveyor belt 215. The front scanner 240 can determine the dimension of the front surface of the item 220, for example, a length and a height of the front surface of the item 220. By using the upper and front scanners 240 and 250, the system 20 can determine a three dimensional size of each of the items 220 and 230, i.e., a length, a width and a height of the item 220. However, the item processing system 20 requires two optical scanners 240 and 250 in order to determine the three dimensional size information of the items 220 and 230.

Various embodiments can automatically determine a three dimensional size of an item (such as a mail package or parcel) using a single optical scanner (an imaging device, an image capturing device or a reader), based on known dimensions of a standard size element such as a mail label provided on a surface of the item. Various embodiments can significantly improve an item processing speed and reduce an overall cost, as a single optical scanner can determine a three dimensional size of an item so that the functionality of computing devices such as an item processing system is significantly improved.

Figure 2A:
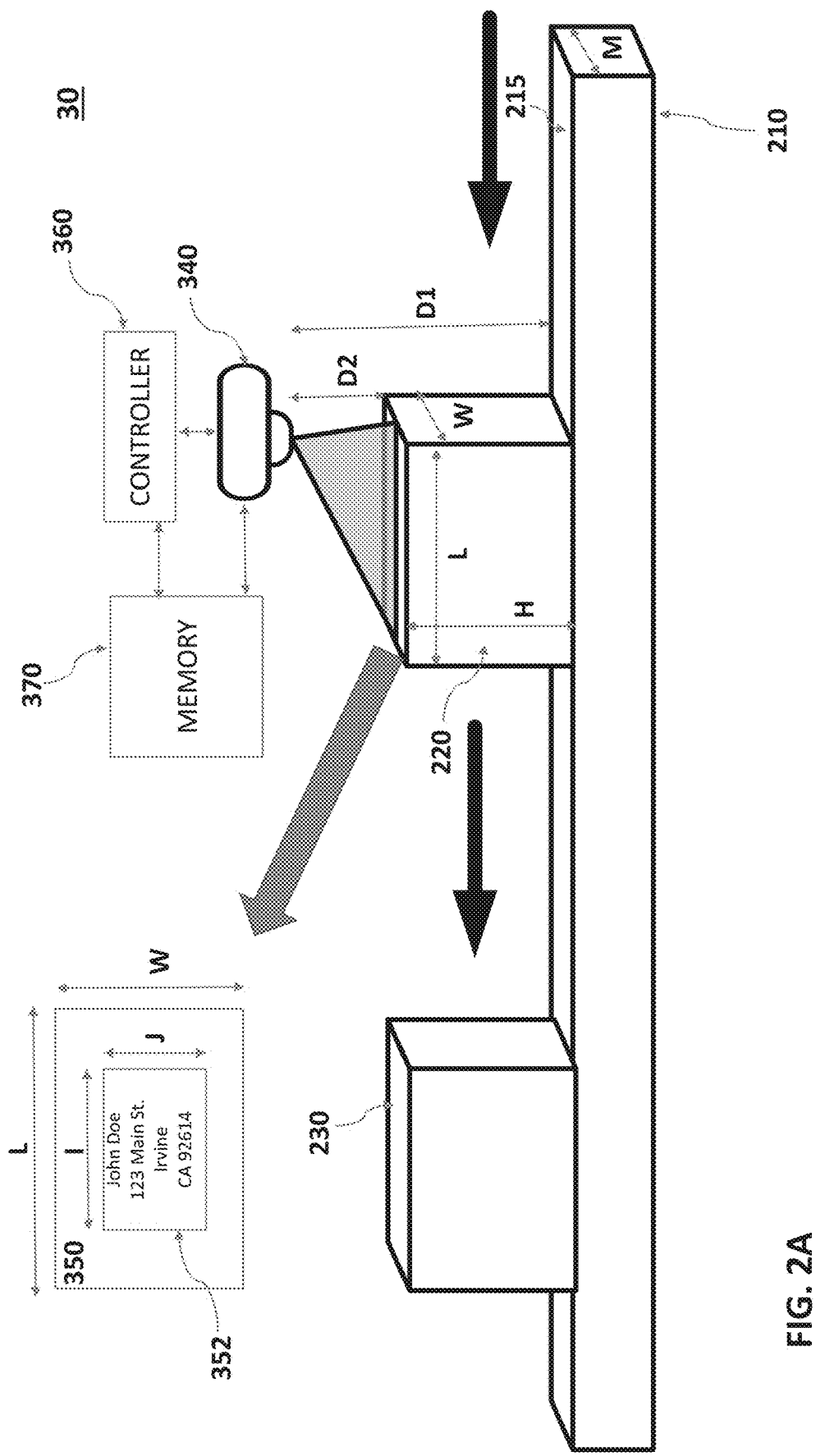
FIG. 2A illustrates an exemplary item processing system for processing items including a single optical scanner according to some embodiments.

FIG. 2A illustrates an item processing system 30 for processing items including a single optical scanner according to some embodiments. Although one type of item processing equipment is depicted in FIG. 2A, the current disclosure is not limited thereto. The systems and methods described here can be applicable to the illustrated type and other types of item processing equipment without departing from the scope of the current disclosure. The item processing system 30 may include an upper optical scanner 340, a controller 360 and a memory 370. The item processing system 30 shown in FIG. 2A is merely an example processing system, and certain elements may be modified or removed, and/or other elements or equipment may be added.

In some embodiments, each of the items 220 and 230 may have a three dimensional size including a length (L), a height (H) and a width (W) as shown in FIG. 2A. The length (L), the height (H) and the width (W) may be the same as or different from each other. The length (L), the height (H) and the width (W) can have values suitable to be transported on the conveyor belt 215 of the conveyor 210. For example, the width (W) of the item 220 can be similar to the thickness or width (M) of the conveyor belt 215. As another example, the width (W) of the item 220 can be less or greater than the thickness or width (M) of the conveyor belt 215. In some embodiments, at least some of the items 220 and 230 may have a standard size. In some embodiments, as shown in FIG. 2A, the height (H) may be greater than the width (W). In other embodiments, the height (H) may be less than or the same as the width (W). The items 220 and 230 may have the same or different dimensions from each other. For example, at least one of the height (H), length (L) and width (W) of the item 220 may be different from the corresponding ones of the item 230. Although items having a box shape are shown in FIG. 2A, other shapes of items can also be used, as long as they have three dimensional sizes. For example, triangular, circular, or other polygonal shapes of items can also be used. Furthermore, the optical scanner 340 can also scan other non-flat items having a fixed height or variable height. For example, a height-adjustable item (e.g., inflatable or deflatable envelope or box) can be used. The adjustable item may have different heights including an initial or original height before being adjusted and an adjusted height after being adjusted and different from the initial height. The description of this paragraph may additionally apply to the embodiments shown in FIG. 3.

The memory 370 may store dimensions of one or more standard size elements provided on (e.g., attached to or printed on) a top surface 350 of each of the items 220 and 230. In some embodiments, the standard size elements may include, but are not limited to, a sender section (or sender label) or a recipient section (or recipient label), a postage section or stamp, a barcode section or a combination thereof.

The standard size elements may be a label, a marking, a symbol, etc., on the item. In some embodiments, a standard size element can include two or more of a sender section, a recipient section, a barcode section and a postage section. The standard size elements may have a square or rectangular shape. In these embodiments, the dimensions of the standard size elements may include lengths and widths of the elements. In some embodiments, the standard size element may have a triangular or circular shape, or other polygonal shape. In these embodiments, the dimensions of the standard size elements may include widths, heights, lengths, or diameters of the elements. For the purpose of convenience, the description will be provided based on the standard size element having a rectangular shape that has a length and a width.

In some embodiments, at least one of the items 220 and 230 is non-adjustable and has a fixed dimension, such as an item with a predetermined dimension or standard dimension, a flat rate box, or a box provided by a distribution network with known dimensions. The memory 370 may store two dimensional or three dimensional size data such as a length and a width of a top or front surface of the item and a height of the item. In some embodiments, the third dimension such as a height may be determined by the controller 360. In some embodiments, the item is adjustable (e.g., an inflatable envelope or box, or a padded envelope or box), and the memory 370 may store three dimensional size data such as a length and a width of a top or front surface of the item, and an original height of the adjustable item measured before the item is adjusted. The height of the adjustable item may be adjusted by inserting a content thereinto or force applied thereto. In these embodiments, an adjusted height of the adjustable item may be determined by the controller 360.

The memory 370 may also store an upper conveyor distance (D1) defined between the upper optical sensor 340 and the conveyor belt 215 (e.g., between a front portion of the upper optical sensor 340 and the top surface of the conveyor 210). The memory 370 may also store a distance (D1) between the a top surface of the conveyor 215 and the optical sensor 340. In some embodiments, the memory 370 can store a scaling factor or relationship for D1. The memory 370 can store sizes of a standard size element 352 and of a sample region on the conveyor belt 215 having the same dimension as the standard size element 352 (to be described in more detail below). The sizes of the standard size elements 352 can be stored in centimeters, inches, etc., in some embodiments, the sizes of the standard size elements 352 can be stored as a number of pixels. For example, the stored pixel size can be the number of pixels that the standard size element 352 would appear if the standard size element 352 were located on the top surface of the conveyor 215. In this way, the controller 360 can identify the number of pixels of a scanned standard size element on an item. The number of pixels of a standard size element 352 on an item which is closer to the optical scanner 340 can be higher, that is, the standard size element 352 will occupy a greater percentage of the image, and therefore, a higher number of pixels than if the standard size element 352 was located on the conveyor 215, without an item in the image. The controller 360 can use a scaling factor or algorithm to compare the pixel sizes to determine the distance D2, using the ratio of pixels and the known distance D1, and can then determine the height H of the item 220. The known distance D1, and/or the scaling factor may be used to determine an item distance (D2) defined between the top surface of the item 350 and the optical sensor 340, without the need of a distance detector or other similar device.

The upper scanner 340 may scan or image the top surface 350 of the item 220 while the item 220 is being transported on the conveyor belt 215. The top surface 350 may include the standard size element 352. The standard size element 352 may be, for example, a recipient section. Although the top surface 350 shows only one standard size element, the top surface 350 may include one or more of other standard size elements such as a sender section, a barcode section, a postage section or a combination thereof. In these embodiments, the upper scanner 340 may capture some or all of the standard size elements. When the upper scanner 340 scans more than one standard size elements, the upper scanner 340 may distinguish one standard size element from other standard size elements based on, for example, computer readable codes provided on the standard size elements, relative positions on the item or known machine learning or deep learning algorithm relating to image recognition and processing. The standard size element 352 is an element that has standard dimensions, or known dimensions, which are stored in the memory 370. For example, a distribution network can use labels on items. The labels can have sender and destination information, and can have patterns of lines thereon delineating various portions of the labels. In some embodiments, the label will have known dimensions which the controller 360 will use to determine the size of the item on which the label is located.

For the purpose of convenience, the description will be based on one standard size element 352 provided on the top surface 350 of the item 220. The top surface 350 may have a length (L) and a width (W). The length (L) of the top surface 350 is the same as the length of the item 220. The width (W) of the top surface 350 is the same as the width of the item 220. The standard size element 352 may have a length (I) and a width (J). The length (I) and width (J) of the standard size element 352 may be respectively smaller than those (L, W) of the top surface 350. The dimensions I and J are known and are stored in the memory 370. The controller 360 uses the known dimensions I and J and uses these with reference to the item length L and the width W to determine numerical dimensions for L, W and H, as will be described in greater detail herein.

The upper optical scanner 340 may continuously and separately capture images of the top surfaces of the items 220 and 230 being transported below the upper scanner 340. In some embodiments, the captured images (gray scale and/or digital data) may be stored in the memory 370. In other embodiments, the captured images may be stored in a memory of the upper scanner 340 or a memory of the controller 360. The optical scanner 340 may be connected to the controller 360 either by wire or wirelessly. In other embodiments, the captured images may be stored in a network memory such as a cloud or other device separately located from the elements 340, 360 and 370. The digital data may be a photograph, binary data, or other format of data. For example, in binary data, a "0" represents a white pixel and "1" represents a black pixel, or vice versa. In some embodiments, at least one of the optical scanner 340 or the controller 360 may read and process the dimensions of the standard size element 352 and the top surface 350 of the item 220. The description of this paragraph may additionally apply to the embodiments of FIG. 3.

Figure 2B:
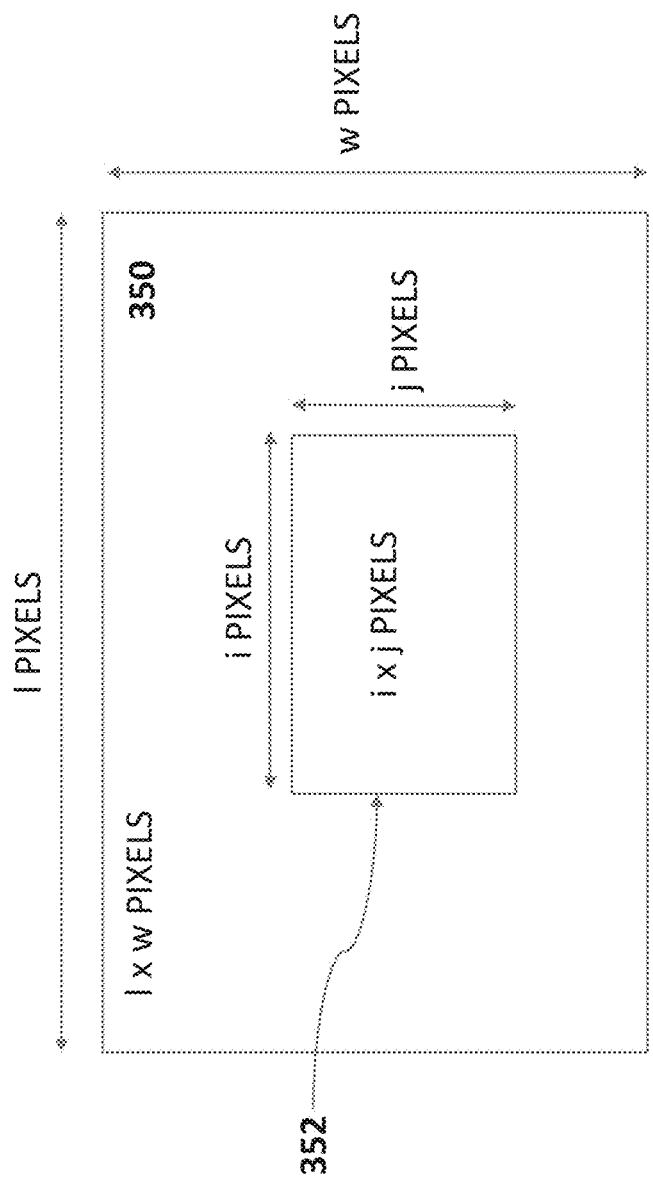
FIG. 2B illustrates an example image of a top surface of an item scanned by the upper single optical scanner of FIG. 2A according to some embodiments.

FIG. 2B illustrates an example image 40 of the top surface 350 of the item 220 scanned by the single scanner 340 of FIG. 2A according to some embodiments. Referring to FIG. 2B, an image of the top surface 350 is shown with l×w pixels. For example, l pixels in the captured image correspond to the length (L) of the top surface 350 and w pixels in the captured image correspond to the width (W) of the top surface 350. Furthermore, FIG. 2B also shows an image of the standard size element 352 represented by i×j pixels, where i pixels in the captured image correspond to the length (I) of the standard size element 352 and j pixels in the captured image correspond to the width (J) of the standard size element 352.

The controller 360 may automatically determine a three dimensional size of the item 220 based on the dimension of the standard size element 352 provided on the top surface 350 of the item 220. In some embodiments, the controller 360 may determine the boundaries of the item 220 in the image captured by the optical scanner 340. This can include using edge detection software and the like. The boundaries of the item 220 in the image can correspond to L and W as described herein.

In some embodiments, the controller 360 may calculate the number of pixels (i) in the captured image corresponding to a length (I) of the standard size element 352 and/or the number of pixels (j) in the captured image corresponding to a width (J) of the standard size element 352. As described above, the memory 370 may store the length and width (I, J) of the standard size element 352. The controller 360 may determine a first ratio (or a length ratio) of the calculated length pixel number (i) to the stored length (I) of the standard size element 352 and/or a second ratio (or a width ratio) of the calculated width pixel number (j) to the stored width (J) of the standard size element 352.

The controller 360 may also calculate the number of pixels (l) in the captured image corresponding to the length (L) of the top surface 350 of the element 220 and the number of pixels (w) in the captured image corresponding to the width (W) of the top surface 350 of the element 220. The controller 360 may determine numerical values for units L, and W of the top surface 350 of the item 220 based on the calculated length and width pixel numbers (l, w) and at least one of the determined first and second ratios. The numerical values can be in inches, centimeters, or other desired units.

In some embodiments, the first and second ratios may be the same as each other. In these embodiments, the length (L) and width (W) of the top surface 350 can be determined using only one of the ratios. For example, when the length (I) of the standard size element 352 is 20 mm, and the corresponding pixel number (i) of the standard size element 352 is 200 (ratio=20/200=0.1) and the calculated length pixel number (1) of the top surface 350 is 2000, then the length of the standard size element 352 (L) of the top surface 350 can be determined to be 200 mm (2000×0.1=200). The width (W) of the top surface 350 can be similarly determined using the calculated width pixel number (w) of the top surface 350 and the length ratio between (J) and width (W) of the item 350. For example, when the calculated width pixel number (w) of the top surface 350 is 1500, then the width (W) of the top surface 350 can be determined to be 150 mm (1500×0.1=150).

In other embodiments, the first and second ratios may be different from each other. In these embodiments, the length (L) and width (W) of the top surface 350 can be determined using both of the ratios. For example, when the length ratio is 0.1 and the width ratio is 0.08, the length (L) of the top surface 350 (2000 pixels) can be determined to be 200 mm (2000×0.1=200) whereas the width (W) of the top surface 350 (1500 pixels) can be determined to be 120 mm (1500×0.08=120).

In some embodiments, the optical sensor 340 may determine an item distance (D2) based on a scaling factor and the known conveyor distance (D1). The scaling factor refers to a relationship between the conveyor distance (D1) and pixel sizes of the standard size element and a sample region. The sample region may be located on the top surface of the conveyor 210. The sample region may have the same size as the standard size element 352 or different sizes. For the purpose of convenience, it is assumed that the physical size of the sample region is the same as that of the standard size element 352. The scaling factor, the physical dimension of the sample region and its pixel size may be stored in the memory 370. Since the standard size element 352 of the top surface 350 is closer to the optical sensor 340 than the top surface of the conveyor 210 where the sample region is located, the pixel size of the standard size element 352 captured by the optical sensor 340 would be proportionally larger than the pixel size of the sample region. Thus, the item distance (D2) would be proportional to the pixel size of the standard size element compared to the pixel size of the sample region. For example, assuming that the upper conveyor distance (D1) is 900 mm, when the pixel size of the sample region is 200×300 and the pixel size of the standard size element 352 is 600×900 (3 times of the pixel size of the sample region), the item distance (D2) may be ⅓ of the upper conveyor distance (D1) which is 300 mm (⅓ of 900 mm). The mathematical relationship (⅓) is merely an example and other relationships may also be possible. Although the entire pixel size is used, only one of the pixel size (e.g., length pixel size or width pixel size) can be used to determine the scaling factor or the relationship.

As described above, the memory 370 may store the upper conveyor distance (D1) defined between the optical sensor 340 and the top surface of the conveyor 210. The controller 360 may determine the height (H=D1−D2) of the item 220 by subtracting the calculated item distance (D2) from the stored upper conveyor distance (D1) (see FIG. 2A). This way, the system 30 can determine the three dimensional size information (e.g., L, W, H) of the item 220 using the single optical sensor 340.

In some embodiments, at least one of the item 220 and the standard size element 352 may have shapes (e.g., polygonal, circular or irregular shapes) other than square or rectangular shapes. In these embodiments, the memory 370 may store a width or widths of the standard size element, and the dimensional information of the top surface of the item can be determined similarly. For example, when the top surface has first and second widths (the same or different from each other), the controller 360 may calculate a number of pixels corresponding to the width of the standard size element, and determine a ratio of the calculated pixel numbers to the stored width of the standard size element. The controller 360 may also calculate a first number of pixels corresponding to the first width of the top surface of the item and a second number of pixels corresponding to the second width of the top surface of the item. The controller 360 may also determine the first and second widths of the top surface of the item based on the first and second pixel numbers of the top surface of the item and the determined ratio. The height of the item 220 can be determined in the same way as described above. In this way, the dimensions of the item 352 can be determined using the upper optical sensor 352 without the need for a separate distance sensing component.

In other embodiments, the optical sensor 340 may sense an item distance (D2) defined between the optical sensor 340 and the top surface 350 of the item 220. The optical sensor 340 may use a variety of available distance measurement technique, including, but not limited to, laser, radar, Lidar, ultrasonic or infrared sensing. The system 30 may include a separate distance measurement sensor (not shown). The separate distance measurement sensor may be located in the controller 360. The separate distance measurement sensor may also be positioned in a separate location as long as the sensor can communicate a sensed distance with the controller 360 or the optical sensor 340 either by wire or wirelessly. Once the item distance (D2) is determined, the controller 360 may determine the height (H=D1−D2) of the item 220 by subtracting the item distance (D2) from the stored upper conveyor distance (D1). The system 30 can determine the three dimensional size information (e.g., L, W, H) of the item 220 using the single optical sensor 340 having a distance sensor and an imaging device, such as a camera.

Figure 3:
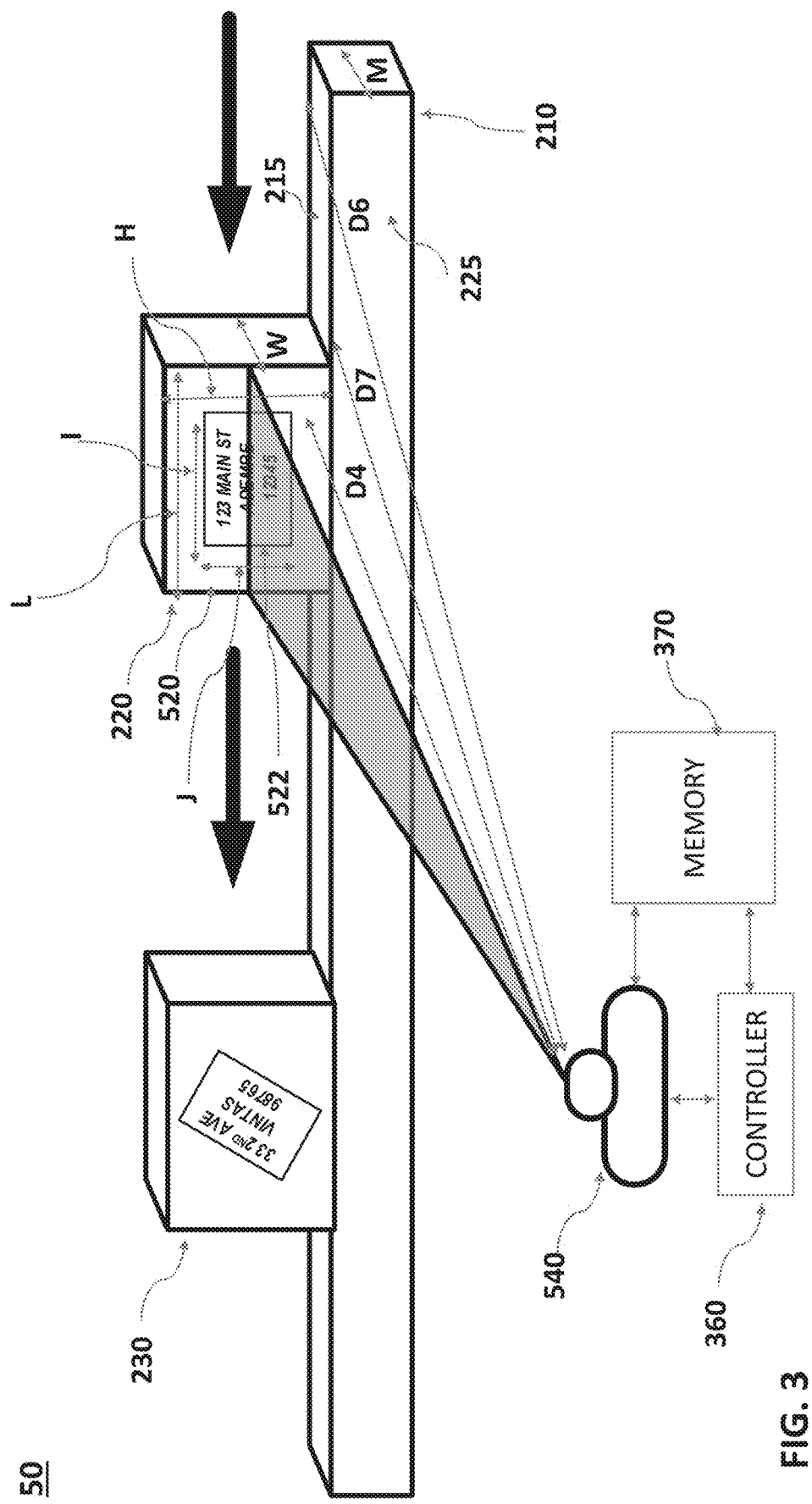
FIG. 3 illustrates an exemplary processing system for processing items including a front single optical scanner according to some embodiments.

FIG. 3 illustrates another item processing system 50 for processing items including a single optical scanner according to some embodiments. The item processing system 50 may be part of item processing equipment described above or can be separately provided, for example, to be disposed adjacent thereto. The item processing system 50 may include a front optical scanner 540, a controller 360 and a memory 370. The item processing system 50 shown in FIG. 3 is merely an example processing system, and certain elements may be modified or removed, and/or other elements or equipment may be added.

The memory 370 may store dimensions of standard size elements provided on a front surface 520 of each of the items 220 and 230. The dimensions of the standard size elements may include lengths and widths of the elements. The memory 370 may also store a front conveyor distance (D7) defined between the front optical sensor 540 and a front surface 225 of the conveyor 210. The memory 370 may also store a rear conveyor distance (D6) defined between the front optical sensor 540 and the rear surface of the conveyor 210.

The front scanner 540 may scan the front surface 520 of the item 220 while the item 220 is being transported on the conveyor belt 215. The front surface 520 of the item 220 may include a standard size element 522 provided thereon. The standard size element 522 may be, for example, a recipient section. Although the front surface 520 shows only one standard size element, the front surface 520 may include other standard size elements including, but not limited to, a sender section, a barcode section, a postage section, or a combination thereof. In these embodiments, the front scanner 540 may capture some or all of the standard size elements provided on the front surface 520 of the item 220. For the purpose of convenience, the description will be based on one standard size element 522 provided on the front surface 520 of the item 220.

The front surface 520 may have a length (L) and a height (H). The standard size element 522 may have a length (I) and a height (J). The length (I) and height (J) of the standard size element 522 may be respectively smaller than those (L, H) of the front surface 520.

Figure 4:
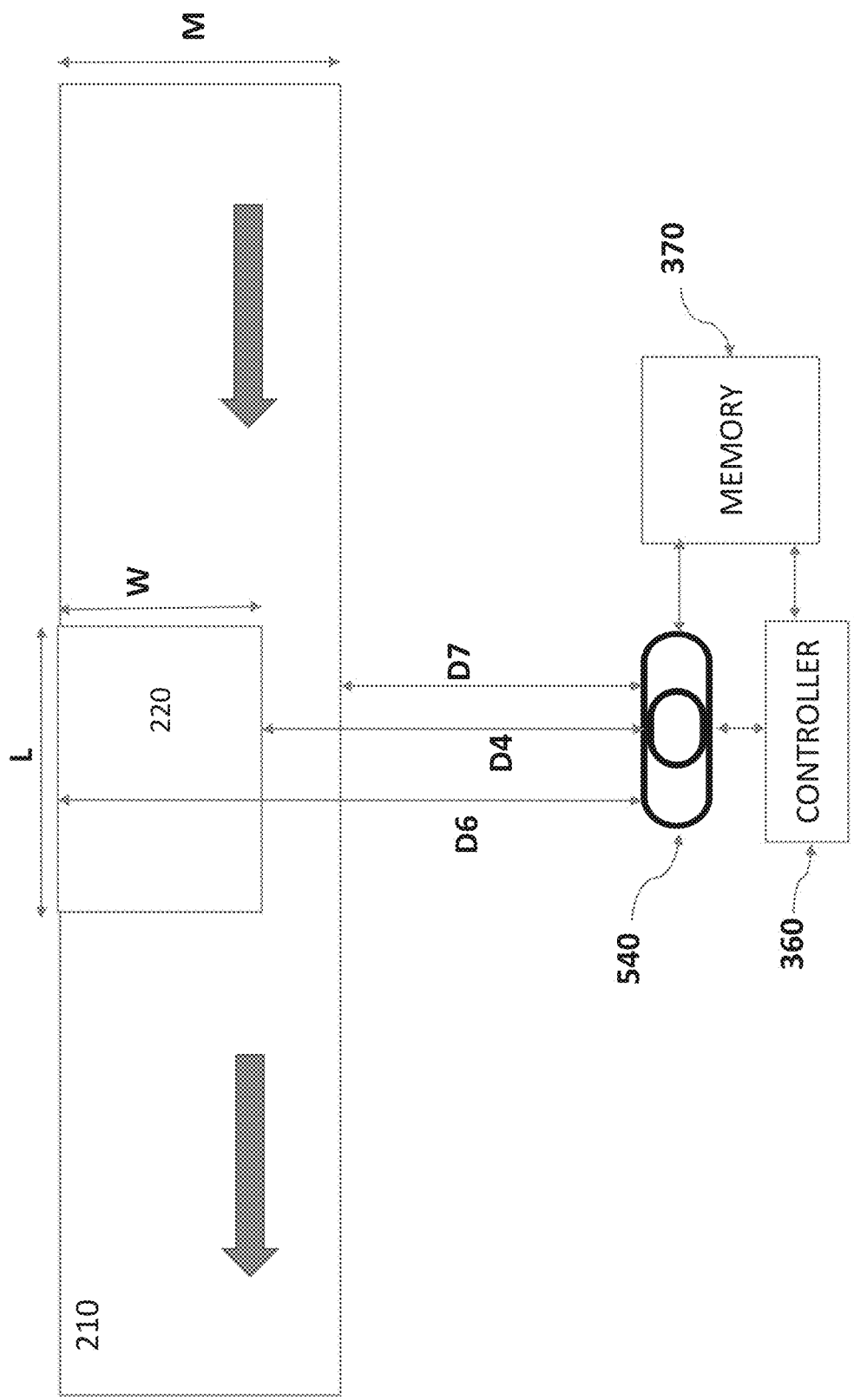
FIG. 4 illustrates a top plan view of the exemplary item processing system of FIG. 3 according to some embodiments.

FIG. 4 illustrates a top plan view of the item processing system 50 of FIG. 3 according to some embodiments. The front surface 520 of the item 220 and the standard size element 522 face the front scanner 540, and thus are not shown in FIG. 4. In some embodiments, the rear side of the item 220 may be substantially aligned with the rear surface of the conveyor 210 while the item 220 is being transported. In other embodiments, the rear side of the item 220 may be positioned to be adjacent to the rear surface of the conveyor 210 while the item 220 is being transported.

Figure 5:
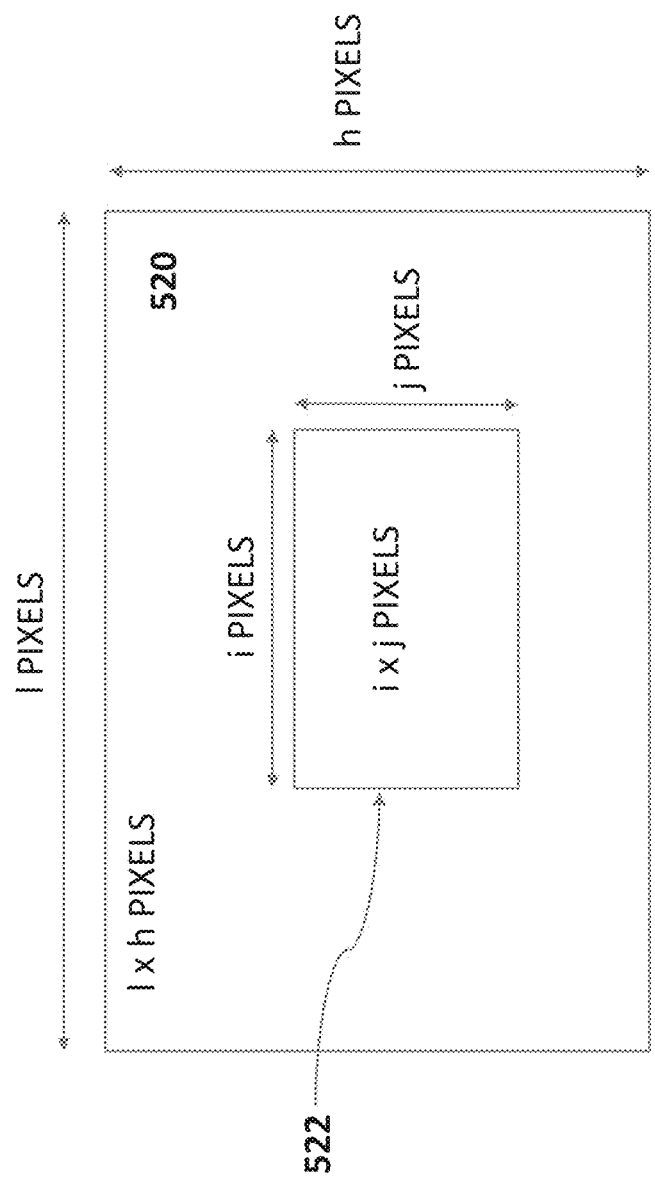
FIG. 5 illustrates an example image of a front surface of an item scanned by the front single optical scanner of FIG. 3 according to some embodiments.

FIG. 5 illustrates an example image 70 of the front surface 520 of the item 220 scanned by the front scanner 540 of FIG. 3 according to some embodiments. Referring to FIG. 5, an image of the front surface 520 is shown with l×h pixels. For example, 1 pixels in the captured image correspond to the length (L) of the front surface 520 and h pixels in the captured image correspond to the height (H) of the front surface 520. Furthermore, FIG. 5 also shows an image of the standard size element 522 represented by i×j pixels, where i pixels in the captured image correspond to the length (I) of the standard size element 522 and j pixels in the captured image correspond to the height (J) of the standard size element 522.

The controller 360 may automatically determine a three dimensional size of the item 220 based on the size of the standard size element 522 provided on the front surface 520. The controller 360 may calculate the horizontal number of pixels (i) in the captured image corresponding to the length (I) and/or the vertical number of pixels (j) corresponding to the height (J) of the standard size element 522. As described above, the memory 370 may store the length and height (I, J) of the standard size element 522. The controller 360 may determine a first ratio (or horizontal ratio) of the horizontal or length pixel number (i) to the stored length (I) and/or a second ratio (or vertical ratio) of the vertical or height pixel number (j) to the stored width (J) of the standard size element 522. As described above, the first and second ratios may be the same as or different from each other.

The controller 360 may also calculate the horizontal number of pixels (w) in the captured image corresponding to the length (L) of the front surface 520 of the element 220 and the vertical number of pixels (h) corresponding to the height (H) of the front surface 520 of the element 220. The controller 360 may determine the length and height (L, H) of the front surface 520 of the item 220 based on the calculated length and height pixel numbers (1, h) of the front surface 520 and at least one of the first and second ratios. For example, when the length (I) is 30 mm, and the corresponding pixel number (i) of the standard size element 522 is 600 (ratio=30/600=0.05) and the calculated horizontal pixel number (1) of the front surface 520 is 3000, then the length (L) of the front surface 520 can be determined to be 150 mm (3000×0.05=150). The height (H) of the front surface 520 can be similarly determined using the ratio and the calculated vertical pixel number (h) of the front surface 520.

In some embodiments, the optical sensor 540 may determine an item distance (D4) defined between the optical sensor 540 and the front surface 520 of the item 220 based on the scaling factor describe above. In these embodiments, the sample region may be located at the rear conveyor distance (D6) (see FIGS. 3 and 4). The item distance (D4) may be determined based on the scaling factor or relationship between the pixel sizes of the standard size element and the sample region, and the known rear conveyor distance (D6). The scaling factor and the rear conveyor distance (D6) may be stored in the memory 370.

In other embodiments, the optical sensor 540 may sense an item distance (D4) defined between the optical sensor 540 and the front surface 520 of the item 220. The controller 360 may determine the width (W=D6−D4) of the item 220 by subtracting the determined or sensed item distance (D4) from the stored rear conveyor distance (D6) (see FIG. 4). This way, the system 30 can determine the three dimensional size information (e.g., L, W, H) of the item 220 using the single optical sensor 540.

In some embodiments, at least one of the item 220 and the standard size element 352/522 may have shapes (e.g., polygonal, circular or irregular shapes) other than square or rectangular shapes. In these embodiments, the memory 370 may store a width or widths of the standard size element, and the dimensional information of the front surface of the item can be determined similarly. For example, when the front surface has first and second widths (the same or different from each other), the controller 360 may calculate a number of pixels in the captured image corresponding to the width of the standard size element, and determine a ratio of the calculated pixel numbers to the stored width of the standard size element. The controller 360 may also calculate a first number of pixels in the captured image corresponding to the first width of the front surface of the item and a second number of pixels in the captured image corresponding to the second width of the front surface of the item. The controller 360 may also determine the first and second widths of the front surface of the item based on the first and second pixel numbers of the front surface of the item and the determined ratio. The height of the item can be determined in the same way as described above.

Figure 6:
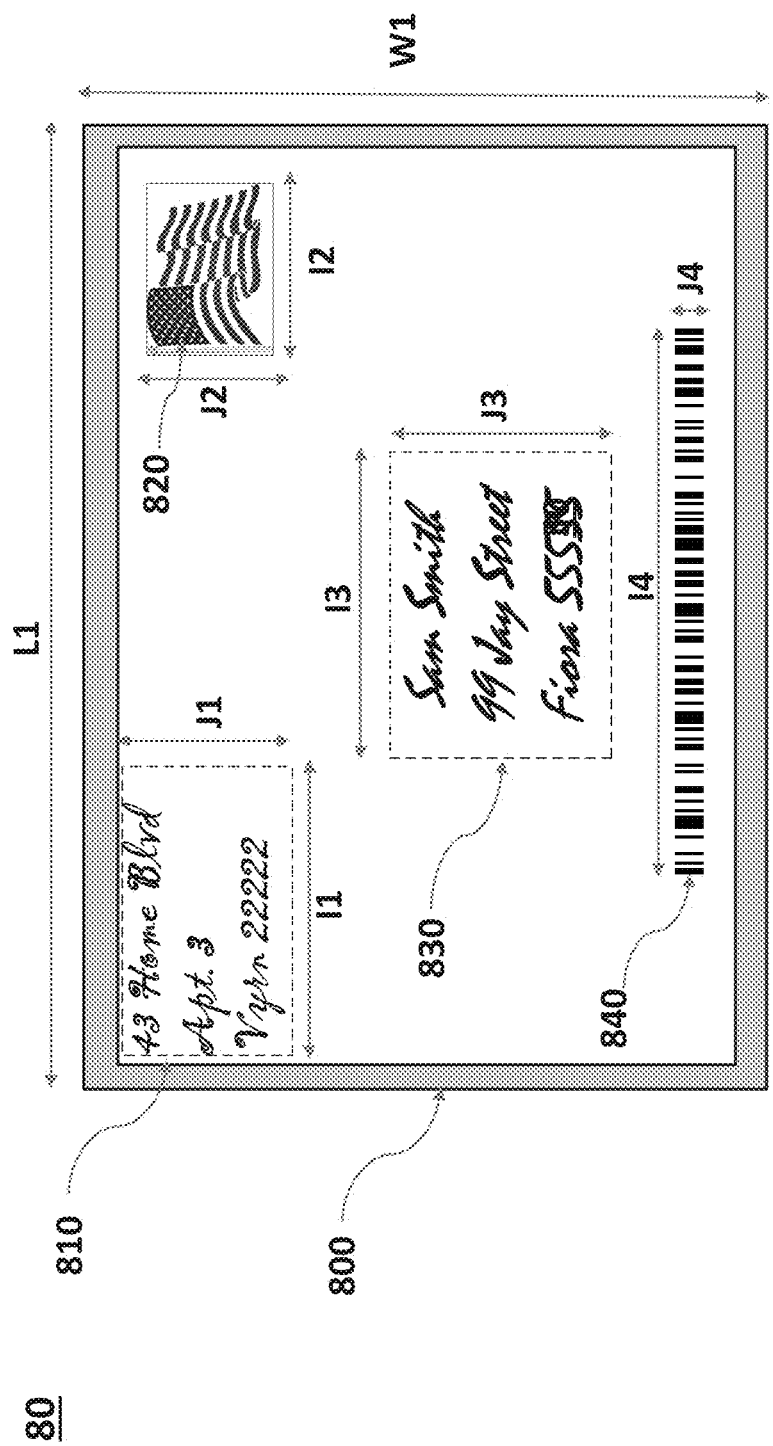
FIG. 6 illustrates example standard size elements provided on a top or front surface of an item according to some embodiments.

FIG. 6 illustrates example standard size elements provided on a top or front surface 800 of an item 80 according to some embodiments. Although FIG. 6 shows four standard size elements, more or less standard size elements can be provided. The top or front surface 800 of the item 80 has a length and a width (L1, W1). The top or front surface 800 includes first to fourth standard size elements 810-840. The first standard size element 810 may be a sender section having a length and a width (I1, J1). The second standard size element 820 may be a stamp section 820 having a length and a width (I2, J2). The third standard size element 830 may be a recipient section 830 having a length and a width (I3, J3). The fourth standard size element 840 may be a barcode section 840 having a length and a width (I4, J4). The memory 370 may store the lengths and widths (I1-I4, J1-J4) in connection with the standard size elements 810-840. Similar to the embodiments of FIGS. 2A-5, the controller 360 can determine the length and width (L1, W1) of the top or front surface 800 of the item 80 using the ratios of the pixel numbers to the lengths of one or more of the standard size elements 810-840, and the pixel numbers of the length and width of the top or front surface 800 of the item 80. Furthermore, the controller 360 may determine the width (W=D1−D2) or height (H=D6−D4) of the item 80 by subtracting the item distance (D2) from the stored upper conveyor distance (D1) as shown in FIG. 2A or subtracting the item distance (D4) from the stored rear conveyor distance (D6) as shown in FIG. 3. This way, the three dimensional size information (e.g., L, W, H) of the item 80 can be determined using a single optical sensor, for example, the upper optical sensor 340 shown in FIG. 2A or the front optical sensor 540 shown in FIG. 3.

Figure 7:
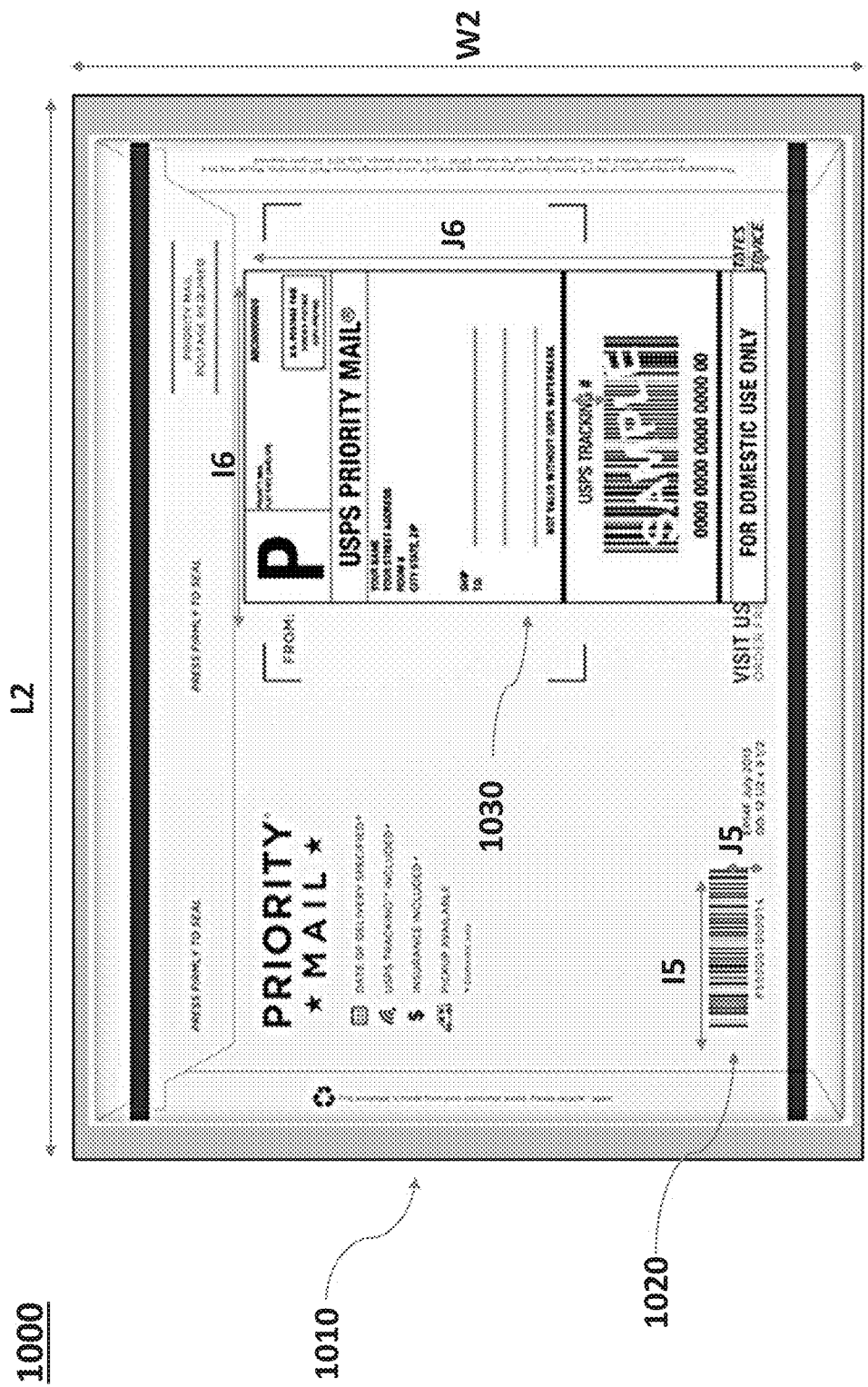
FIG. 7 illustrates another example standard size elements provided on a top or front surface of an item according to some embodiments.

FIG. 7 illustrates another example standard size elements provided on a top or front surface 1010 of an item 1000 according to some embodiments. Although FIG. 7 shows two standard size elements, more or fewer standard size elements can be provided. The top or front surface 1010 of the item 1000 has a length and a width (L2, W2). The top or front surface 1010 includes first and second standard size elements 1020 and 1030. The first standard size element 1020 may be a barcode section having a length and a width (I5, J5). The second standard size element 1030 may be a special item section having a length and a width (I6, J6). The memory 370 may store the lengths and widths (I5/I6, J5/J6) of the standard size elements 1020 and 1030. Similar to the previous embodiments, the controller 360 can determine the length and width (L2, W2) of the top or front surface 1010 of the item 1000 using the ratio of calculated pixel numbers to stored lengths of at least one of the standard size elements 1020 and 1030, and calculated pixel numbers of the length and width (L2, W2) of the top or front surface 1010 of the item 1000. Furthermore, the controller 360 may determine the width (W=D1−D2) or height (H=D6−D4) of the item 1000 by subtracting the item distance (D2) from the stored upper conveyor distance (D1) as shown in FIG. 2A or subtracting the item distance (D4) from the stored rear conveyor distance (D6) as shown in FIG. 3. This way, the three dimensional size information (e.g., L, W, H) of the item 1000 can be determined using a single optical sensor, for example, the upper optical sensor 340 shown in FIG. 2A or the front optical sensor 540 shown in FIG. 3.

Figure 8:
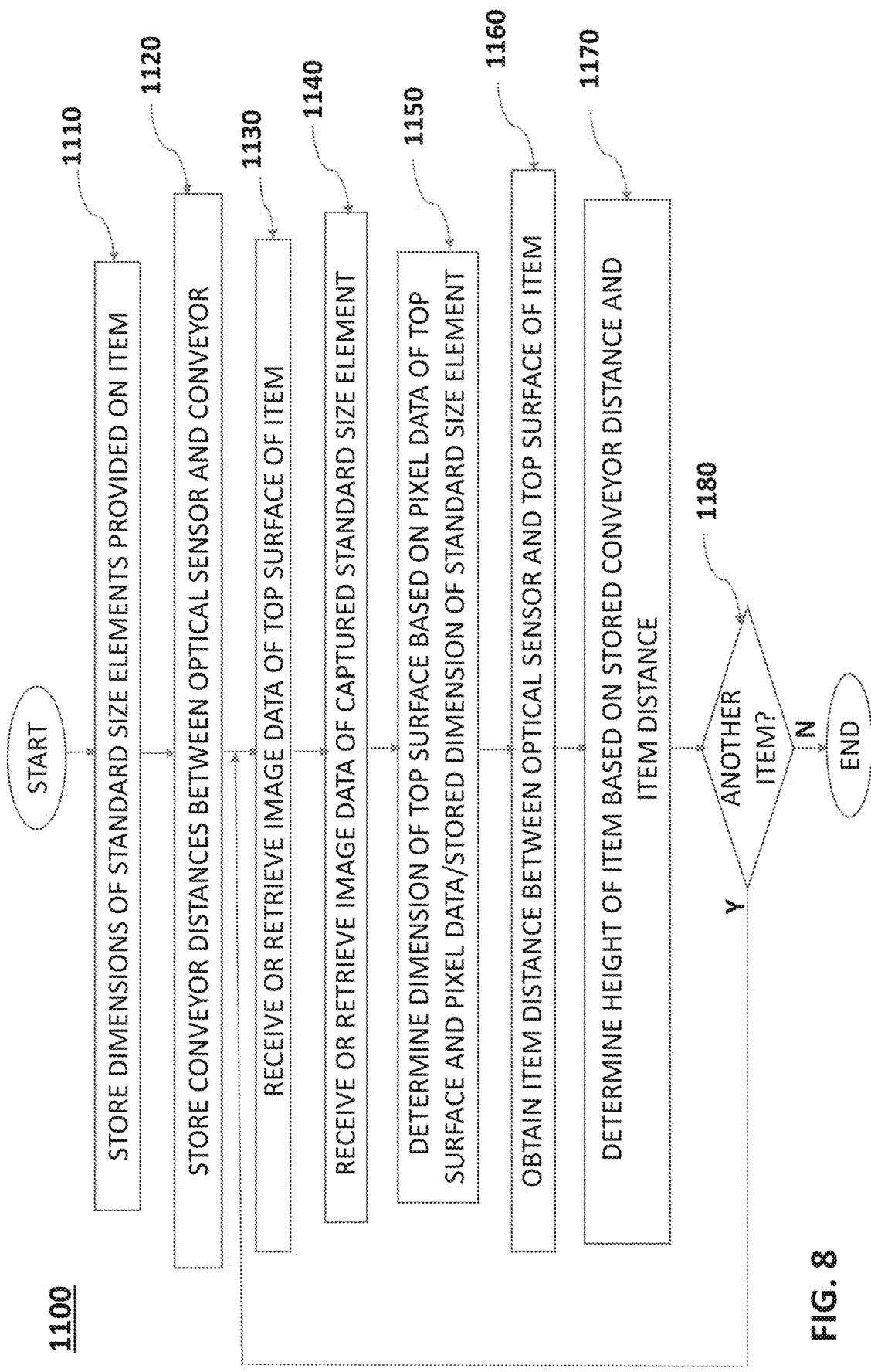
FIG. 8 is a flow diagram of an exemplary method for automatically determining a three dimensional size of an item according to some embodiments.

FIG. 8 is a process 1100 of a method for automatically determining a three dimensional size of an item according to some embodiments. In some embodiments, the process 1100 may be performed by at least one of the optical scanner (340/540) or the controller 360. In other embodiments, the process 1100 may be performed by a computing device separate from and/or in data communication with at least one of the optical scanner (340/540) or the controller 360. Computer readable instructions configured to execute the process 1100 may be stored in the memory 370. Although the process 1100 is described herein with reference to a particular order, in various embodiments, states herein may be performed in a different order, or omitted, and additional states may be added. The description of this paragraph may also apply to the processes 1200 and 1300 shown in FIGS. 9 and 10.

For the purpose of convenience, the description will be provided based on the controller 360 performing the process 1100. In state 1110, the controller 360 may store dimensions of standard size elements provided on an item in the memory 370. As described above, the dimensions of the standard size elements may include lengths and widths of the elements. Non-limiting examples of the standard size elements are shown in FIGS. 6 and 7.

In state 1120, the controller 360 may store conveyor distances defined between the optical sensor 340/540 and the conveyor 210 in the memory 370. The conveyor distances may include an upper conveyor distance (D1) defined between the upper optical sensor 340 and the top surface of the conveyor 210 (see FIG. 2A). The conveyor distances may also include a rear conveyor distance (D6) defined between the front optical sensor 540 and the rear surface of the conveyor 210 (see FIG. 3). The conveyor distances may further include a front conveyor distance (D7) defined between the front optical sensor 540 and the front surface 520 of the conveyor 210 (see FIG. 3).

In state 1130, the controller 360 may receive or retrieve scanned image data of the top surface 350 of the item 220. In some embodiments, the controller 360 may receive the scanned image data of the top surface 350 of the item 220 from the upper optical scanner 340. In other embodiments, the upper optical scanner 340 may scan the top surface 350 of the item 220 while the item 220 is being transported on the conveyor 210 and store the scanned image data on the memory 370. In these embodiments, the controller 360 may retrieve the stored image data of the top surface 350 of the item 220 from the memory 370.

In state 1140, the controller 360 may receive or retrieve scanned image data of the standard size element 352. In some embodiments, the controller 360 may receive the scanned image data of the standard size element 352 from the upper optical scanner 340. In other embodiments, the upper optical scanner 340 may scan the standard size element 352 while the item 220 is being transported on the conveyor 210 and store the scanned image data on the memory 370. In these embodiments, the controller 360 may retrieve the stored image data of the standard size element 352 from the memory 370.

In state 1150, the controller 360 may determine the dimension of the top surface 350 of the item 220 based on the scanned image data of the top surface 350 and the image data and stored dimensions of the standard size element 352. For example, as described with respect to FIGS. 2A-5, the controller 360 may determine the length and width (L, W) of the top surface 350 of the item 220 using the length and width pixel numbers (l×w) of the top surface 350 and a ratio of the pixel numbers (i×j) of the standard size element 352 to the stored dimensions (I, J) of the standard size element 352.

In state 1160, the controller 360 may obtain the item distance (D2) between the upper optical sensor 340 and the top surface 350 of the item 220 using the scaling factor described above or sense the item distance (D2) as shown in FIG. 2A. In some embodiments, the controller 360 may receive the item distance (D2) from the upper optical scanner 340. In other embodiments, the upper optical scanner 340 may determine or sense the item distance (D2) between the upper optical sensor 340 and the top surface 350 of the item 220 and store the item distance (D2) in the memory 370. In these embodiments, the controller 360 may retrieve the stored item distance (D2) from the memory 370. In still other embodiments, the controller 360 may directly determine the item distance (D2) between the upper optical sensor 340 and the top surface 350 of the item 220. In still other embodiments, the controller 360 may receive the item distance (D2) from the optical sensor 340 or a separate distance sensor (not shown).

In state 1170, the controller 360 may determine the height (H) of the item 220 based on the stored upper conveyor distance (D1) and the item distance (D2). For example, as described with respect to FIGS. 2A and 2B, the controller 360 may determine the height (H=D1−D2) of the item 220 by subtracting the item distance (D2) from the stored conveyor distance (D1).

In state 1180, the controller 360 may determine whether there is another item to determine a three dimensional size thereof. If it is determined in state 1180 that there is another item to determine its three dimensional size thereof, the states 1130-1170 may repeat. If it is determined in state 1180 that there is no item to determine its three dimensional size thereof, the process 1100 may end. This way, the system 30 can determine the three dimensional size information (e.g., L, W, H) of the item 220 using the single optical sensor 340.

Figure 9:
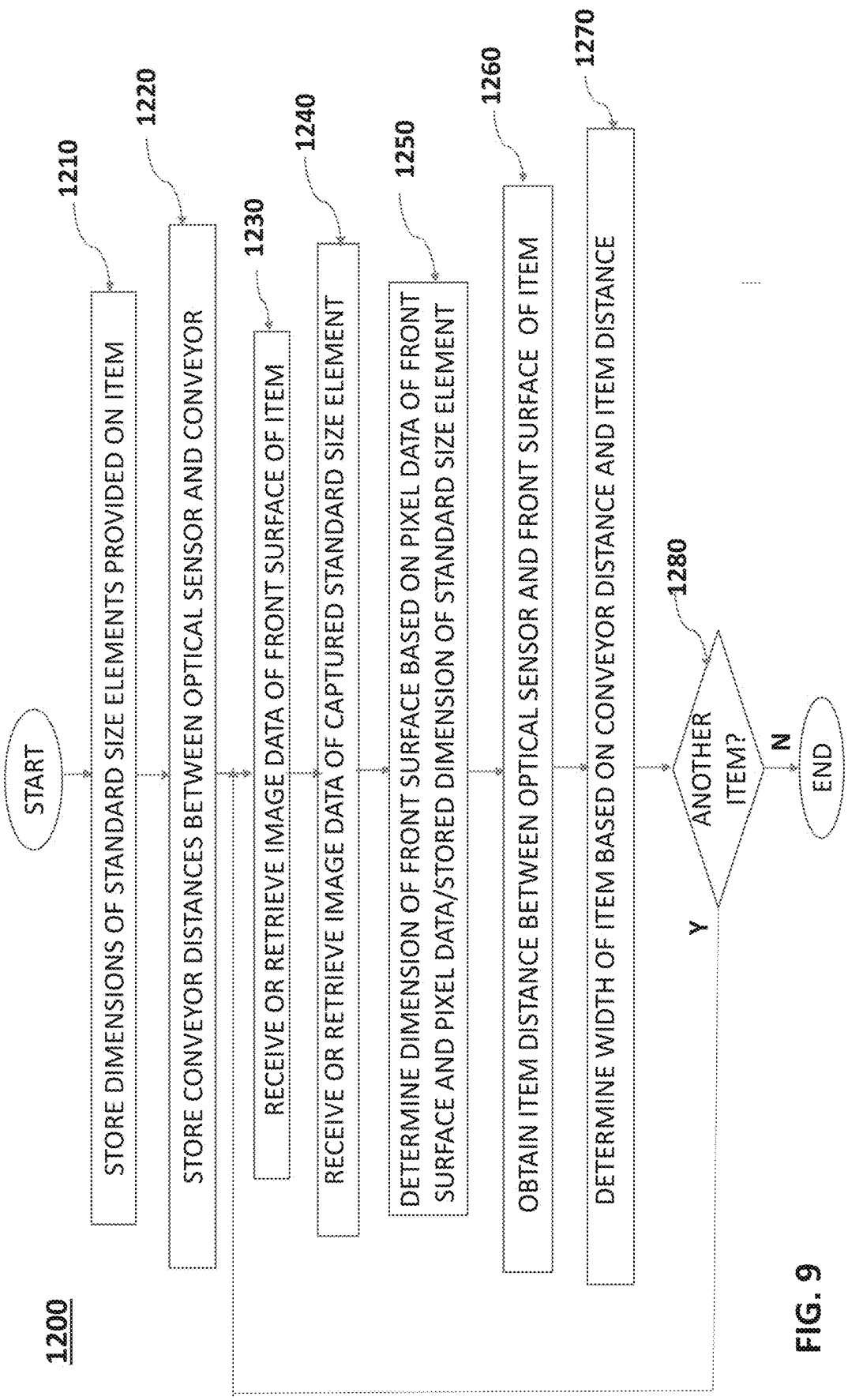
FIG. 9 is a flow diagram of an exemplary method for automatically determining a three dimensional size of an item according to some embodiments.

FIG. 9 is another process 1200 of a method for automatically determining a three dimensional size of an item according to some embodiments. For the purpose of the convenience, the description will be made based on the controller 360 performing the process 1200.

In state 1210, the controller 360 may store dimensions of standard size elements provided on an item in the memory 370. As described above, the dimensions of the standard size elements may include lengths and widths of the elements.

In state 1220, the controller 360 may store conveyor distances between the optical sensor 340/540 and the conveyor 210 in the memory 370. The conveyor distances may include the upper conveyor distance (D1), the front conveyor distance (D7) and the rear conveyor distance (D6) described with respect to FIG. 8.

In state 1230, the controller 360 may receive or retrieve scanned image data of a front surface 520 of the item 220 (see FIG. 3). In some embodiments, the controller 360 may receive the scanned image data of the front surface 520 of the item 220 from the front optical scanner 540. In other embodiments, the front optical scanner 540 may scan the front surface 520 of the item 220 while the item 220 is being transported on the conveyor 210 and store the scanned image data on the memory 370. In these embodiments, the controller 360 may retrieve the stored image data of the front surface 520 of the item 220 from the memory 370.

In state 1240, the controller 360 may receive or retrieve scanned image data of a standard size element 522 (see FIG. 3). In some embodiments, the controller 360 may receive the image data of the standard size element 522 from the front optical scanner 540. In other embodiments, the front optical scanner 540 may scan the standard size element 522 while the item 220 is being transported on the conveyor 210 and store the scanned image data on the memory 370. In these embodiments, the controller 360 may retrieve the stored image data of the standard size element 522 from the memory 370.

In state 1250, the controller 360 may determine the dimension of the front surface 520 of the item 220 based on the scanned image data of the front surface 520 and the image data and stored dimensions of the standard size element 522. For example, as described with respect to FIGS. 2A-5, the controller 360 may determine the length and height (L, H) of the front surface 520 of the item 220 using the length and height pixel numbers (l×h) of the front surface 520 and a ratio of the calculated pixel numbers (i×j) of the standard size element 522 to the stored dimensions (I, J) of the standard size element 522.

In state 1260, the controller 360 may obtain an item distance (D4) between the front optical sensor 540 and the front surface 520 of the item 220 as shown in FIG. 3. In some embodiments, the controller 360 may receive the item distance (D4) from the front optical scanner 540. In other embodiments, the front optical scanner 540 may determine the item distance (D4) between the front optical sensor 540 and the front surface 520 of the item 220 as described above and store the determined item distance (D4) in the memory 370. In these embodiments, the controller 360 may retrieve the stored item distance (D4) from the memory 370. In still other embodiments, the controller 360 may directly determine the item distance (D4) between the front optical sensor 540 and the front surface 520 of the item 220. In still other embodiments, the controller 360 may receive the item distance (D4) from the optical sensor 540 or a separate distance sensor (not shown).

In state 1270, the controller 360 may determine the width (W) of the item 220 based on the stored rear conveyor distance (D6) and the item distance (D4). For example, as described with respect to FIGS. 2A-5, the controller 360 may determine the width (W=D6-D4) of the item 220 by subtracting the item distance (D4) from the stored rear conveyor distance (D6).

In state 1280, the controller 360 may determine whether there is another item to determine a three dimensional size thereof. If it is determined in state 1280 that there is another item to determine its three dimensional size thereof, the states 1230-1270 may repeat. If it is determined in state 1280 that there is no item to determine its three dimensional size thereof, the process 1200 may end. This way, the system 50 can determine the three dimensional size information (e.g., L, W, H) of the item 220 using the single optical sensor 540.

Figure 10:
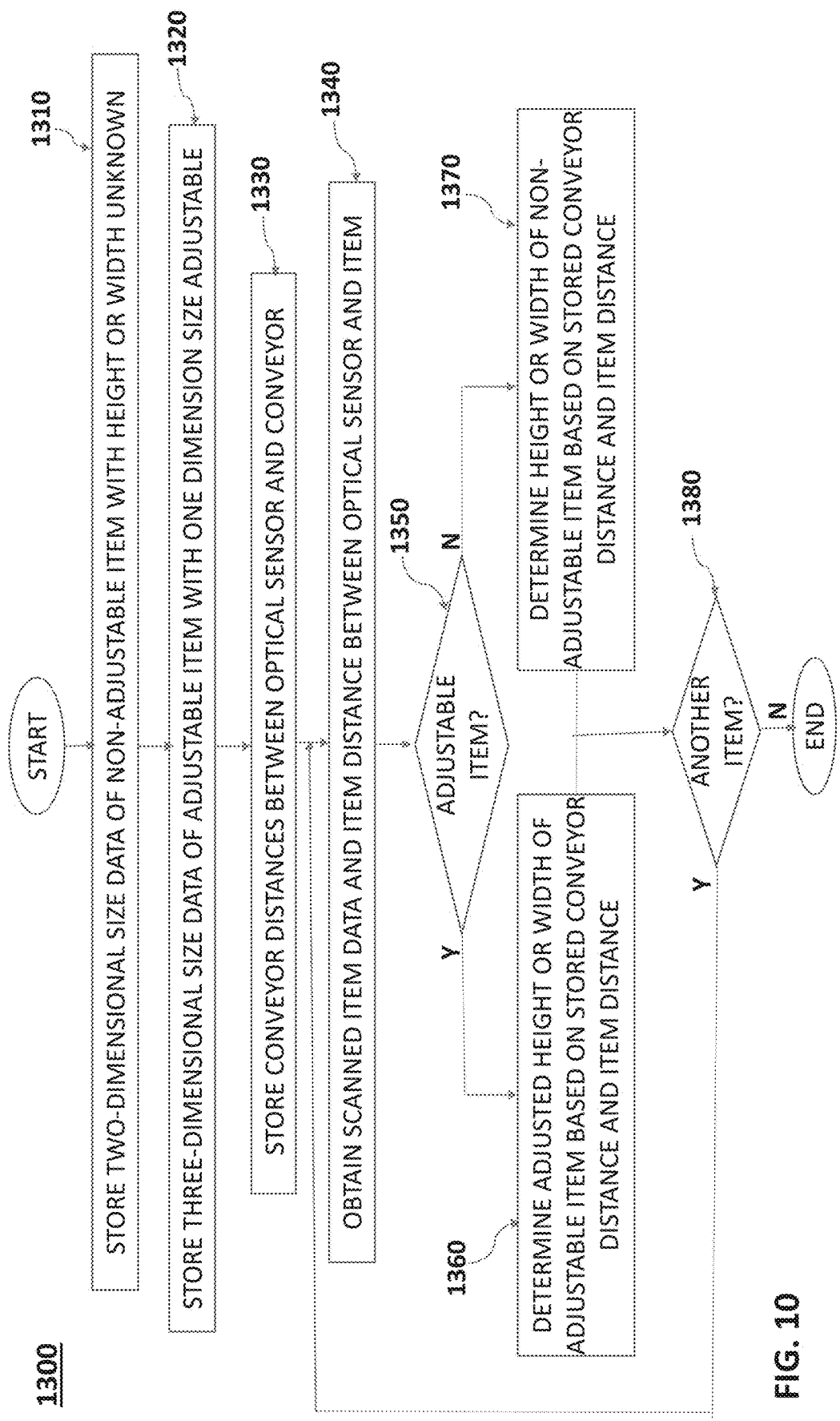
FIG. 10 is a flow diagram of an exemplary method for automatically determining a three dimensional size of an item according to some embodiments.

FIG. 10 is another process 1300 of a method for automatically determining a three dimensional size of an item according to some embodiments. For the purpose of the convenience, the description will be made based on the controller 360 performing the process 1300.

In state 1310, the controller 360 may store two-dimensional size data of a non-adjustable item with height or width unknown. The non-adjustable item may include an item (e.g., box) having a height dimension generally fixed or not adjustable. The two dimensional size data may include the length and width of a surface of the item, for example, a top surface or a front surface facing the optical scanner 340 or 540. The two dimensional size data may not include the height or width of the item to be determined by the controller 360.

In state 1320, the controller 360 may store three-dimensional size data of an adjustable item with one dimension size adjustable. The adjustable item may have a height or width dimension adjustable. The three dimensional size data may include the length and width of a surface of the item, for example, a top surface or a front surface facing the optical scanner 340 or 540. The three dimensional size data may also include an original height data which is measured or sensed prior to being adjusted. The three dimensional size data may not include an adjusted height or width of the adjustable item to be determined by the controller 360.

In state 1330, the controller 360 may store conveyor distances between the optical sensor 340/540 and the conveyor 210 in the memory 370, for example, using the processes 1100 and 1200 discussed above with respect to FIGS. 8 and 9.

In state 1340, the controller 360 may obtain scanned item data and an item distance (D2) between the upper optical sensor 340 and the top surface 350 of the item 220 or an item distance (D4) between the front optical sensor 540 and the front surface 520 of the item 220, for example, using the processes 1100 and 1200 discussed above with respect to FIGS. 8 and 9.

In state 1350, the controller 360 may determine whether the scanned item is an adjustable item. In some embodiments, the controller 360 may determine that the scanned item is an adjustable item based on, for example, computer readable information (e.g., barcode or QR code) provided on the top or front surface of the item 220. In other embodiments, the controller 360 may determine that the scanned item is an adjustable item based on a scanned image of the item 220 and known machine learning or deep learning algorithm relating to image recognition and processing.

If it is determined in state 1350 that the scanned item is an adjustable item, the controller 360 may determine an adjusted height or width of the adjustable item based on the stored conveyor distance and the item distance. For example, as described with respect to FIGS. 2A and 2B, the controller 360 may determine the adjustable height (H=D1−D2) of the item 220 by subtracting the item distance (D2) from the stored upper conveyor distance (D1). Furthermore, as described with respect to FIGS. 3-5, the controller 360 may determine the adjusted width (W=D6−D4) of the item 220 by subtracting the item distance (D4) from the stored rear conveyor distance (D6). The adjusted height may be different from the original or initial height of the adjustable item.

If it is determined in state 1350 that the scanned item is not an adjustable item, the controller 360 may determine the height of the non-adjustable item based on the stored conveyor distance and item distance (state 1370), for example, using the processes 1100 AND 1200 described above with respect to FIGS. 8 and 9.

In state 1380, the controller 360 may determine whether there is another item to determine a three dimensional size thereof. If it is determined in state 1380 that there is another item to determine its three dimensional size thereof, the states 1340-1370 may repeat. If it is determined in state 1380 that there is no item to determine its three dimensional size thereof, the process 1300 may end. This way, the system 30 or 50 can determine the three dimensional size information (e.g., L, W, H) of the item 220 using the single optical sensor 340/540, whether the item 220 is adjustable or not.

In the FIG. 10 embodiment, since the two dimensional size data of a non-adjustable item and an adjustable item are already stored in the memory 370, there is no need to determine the dimension of the top or front surface of the item facing the optical scanner 340 or 540. Furthermore, although the original height of an adjustable item is stored, since the adjustable item inflates or deflates, the system 30 or 50 may determine the adjusted height of the adjustable item.

Figure 11:
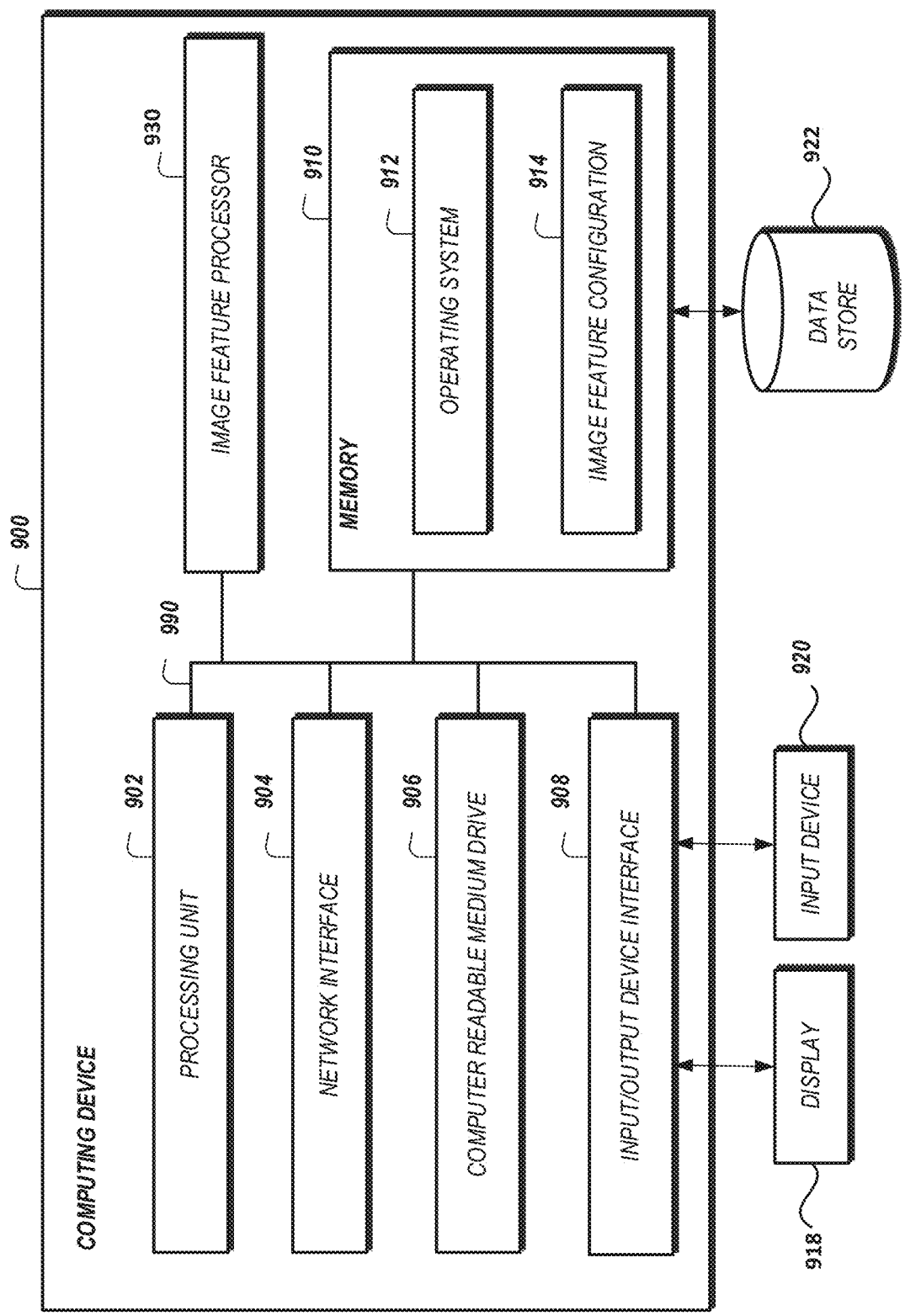
FIG. 11 is an exemplary block diagram of a computing device for implementing item dimension determining methods described with respect to FIGS. 8-10 according to some embodiments.

FIG. 11 is a block diagram of an embodiment of a computing device 900 for implementing the item dimension determining methods described above with respect to FIGS. 8-10. FIG. 11 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. In some embodiments, the computing device 900 may implement the features of one or more of the optical scanners 340/540 and the controller 360. In other embodiments, at least some elements of the computing device 900 may be included in one or more of the optical scanners 340/540 and the controller 360 to perform an entirety or part of the processes 1100-1300 shown in FIGS. 8-10. In still other embodiments, the computing device 900 may be in data communication with one or more of the optical scanners 340/540 and the controller 360 to perform an entirety or part of the processes 1100-1300 shown in FIGS. 8-10.

The network interface 904 can provide connectivity to one or more networks or computing systems. The network interface 904 can receive information and instructions from other computing systems or services via the network interface 904. The network interface 904 can also store data directly to the memory 910. The processing unit 902 can communicate to and from the memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more of the embodiments described above. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 11. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that some embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for processing items, the system comprising:
a sensor configured to:
scan an item located proximate a surface, the surface spaced apart from the sensor by a first distance;
one or more processors in communication with the sensor to the one or more processors configured to:
receive, from the sensor, a scan of the surface of the item;
determine a second distance, the second distance corresponding to a distance between the sensor to the item;
determine, based on the received scan of the item, an item type of the item, the item type comprising a first fixed dimension and a second fixed dimension; and
in response to determining the item type, determine:
a first dimension of the item based at least in part on the first fixed dimension of the item type;
a second dimension of the item based at least in part on the second fixed dimension of the item type; and
a third dimension of the item based at least in part on the first distance and the second distance.

2. The system of claim 1, wherein the item type comprises a third adjustable dimension, wherein the one or more processors are configured to determine the third adjustable dimension based at least in part on the first distance and the second distance.

3. The system of claim 2, wherein the item is a flexible envelope or box.

4. The system of claim 1, wherein the one or more processors are further configured to determine a difference between the first distance and the second distance.

5. The system of claim 1, wherein a determination of the item type uses a machine learning algorithm or a deep learning algorithm for image recognition and processing.

6. The system of claim 1, wherein the one or more processors are further configured to identify, in the received scan of the item, a label on the item.

7. The system of claim 6, wherein the one or more processors are further configured to identify the first dimension and the second dimension of the item based on the identified label.

8. The system of claim 6, wherein the surface is a conveyor in item processing equipment, and wherein the item processing equipment is configured to sort the item based on the third dimension, the first dimension, and the second dimension.

9. The system of claim 1, further comprising a memory storing one or more item types and one or more fixed dimensions associated with the one or more item types.

10. The system of claim 9, wherein the one or more processors are further configured to determine, based on the received scan of the item, a type of the one or more item types of the scanned item.

11. A method for processing items, the method comprising:
scanning, using a sensor, an item located proximate a surface, the surface spaced apart from the sensor by a first distance;
receiving, from the sensor, in one or more processors, a scan of the surface of the item;
determining, by the one or more processors, based on the received scan, a second distance, the second distance corresponding to a distance between the sensor and the item;
determining, by the one or more processors, based on the received scan of the item, an item type of the item, the item type comprising a first fixed dimension and a second fixed dimension; and
in response to determining the item type, determining, by the one or more processors:
a first dimension of the item based at least in part on the first fixed dimension of the item type;
a second dimension of the item based at least in part on the second fixed dimension of the item type; and
a third dimension of the item based at least in part on the first distance and the second distance.

12. The method of claim 11, wherein the item type comprises a third adjustable dimension, wherein the method further comprises determining the third adjustable dimension based at least in part on the first distance and the second distance.

13. The method of claim 12, wherein the item is a flexible envelope or box.

14. The method of claim 11, the method further comprising determining, by the one or more processors, a difference between the first distance and the second distance.

15. The method of claim 11, wherein a determination of the item type uses a machine learning algorithm or a deep learning algorithm for image recognition and processing.

16. The method of claim 11, the method further comprising identifying, by the one or more processors, in the received scan of the item, a label on the item.

17. The method of claim 16, the method further comprising identifying, by one or more processors, the first dimension and the second dimension of the item based on the identified label.

18. The method of claim 16, wherein the surface is a conveyor in item processing equipment, and wherein the item processing equipment is configured to sort the item based on the third dimension, the first dimension, and the second dimension.

19. The method of claim 11, the method further comprising storing, by the one or more processors, in a memory, one or more item types and one or more known dimensions associated with the one or more item types.

20. The method of claim 19, the method further comprising determining, by the one or more processors, based on the received scan of the item, a type of the one or more item types of the scanned item.

* * * * *